United States Patent [19]

Hisatomi et al.

[11] Patent Number: 4,993,961
[45] Date of Patent: Feb. 19, 1991

[54] IGNITION PLUG SOCKET

[75] Inventors: Masahiro Hisatomi, Kanagawa; Mitsuyasu Tanaka, Shizuoka, both of Japan

[73] Assignees: Nissan Motor Co., Ltd.; Yazaki Corporation, both of Japan

[21] Appl. No.: 486,935

[22] Filed: Mar. 1, 1990

[30] Foreign Application Priority Data

Mar. 3, 1989 [JP] Japan .................. 64-24398[U]

[51] Int. Cl.[5] ............................. H01R 13/72
[52] U.S. Cl. .................... 439/125; 439/501; 248/68.1
[58] Field of Search ............... 248/68.1, 74.2; 439/125, 501

[56] References Cited

U.S. PATENT DOCUMENTS 4,407,472 10/1983 Beck ........................ 248/68.1
4,813,639 3/1989 Midkiff et al. ............. 248/68.1
4,864,697 9/1989 Sparks et al. .............. 248/68.1

FOREIGN PATENT DOCUMENTS 2648432 5/1975 France ..................... 248/74.2
167479 10/1986 Japan .

Primary Examiner—Gary F. Paumen
Attorney, Agent, or Firm—Wigman & Cohen

[57] ABSTRACT

To arrange and clamp plural high tension cords accurately and orderly in parallel to each other within a narrow space on an engine cover for prevention of the cords from vibration, a high tension cord clamp member is selectively and removably attached to a plug socket body, according to the number and the arrangement position of the high tension cords. That is, some cord clamp members formed with different cord holding portions and different cord holding cutouts portions are previously prepared and selectively mounted on ignition plug sockets according to engine model. Therefore, the high tension cord arrangement work productivity can be improved, because high tension cords can be previously assembled, before the plug sockets are connected to the ignition plugs, by use of the cord clamp members removably attached to the plug sockets.

8 Claims, 5 Drawing Sheets

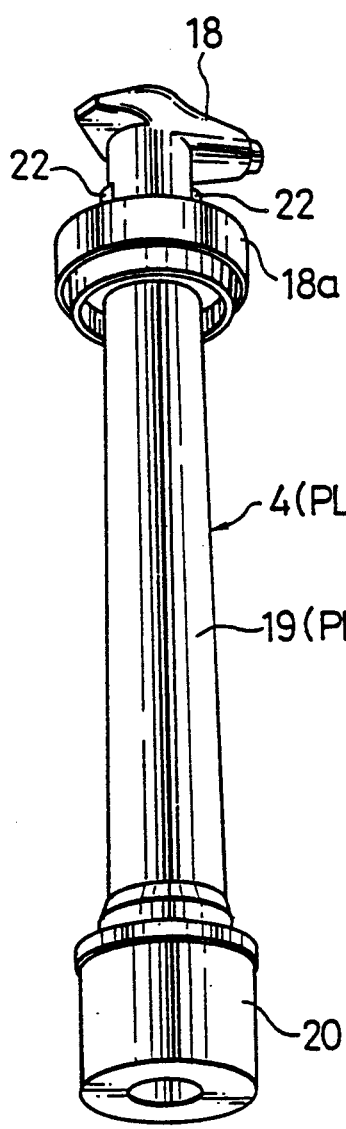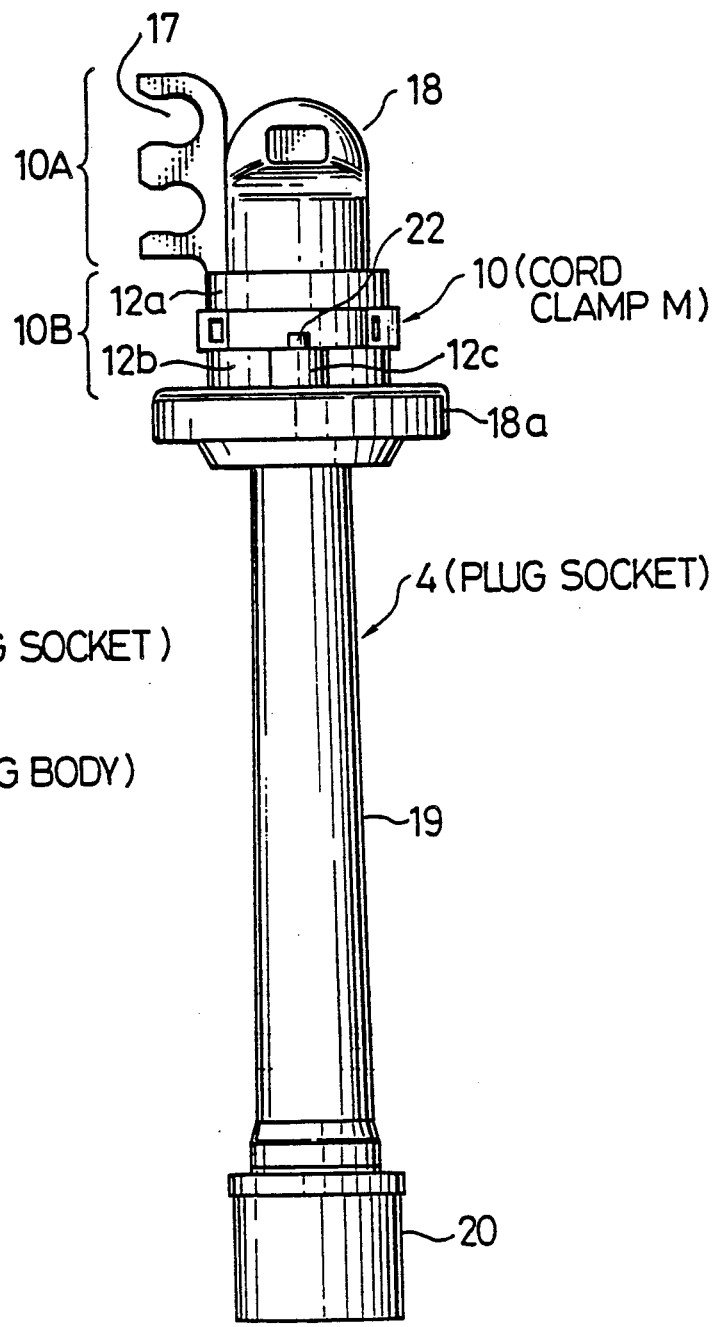

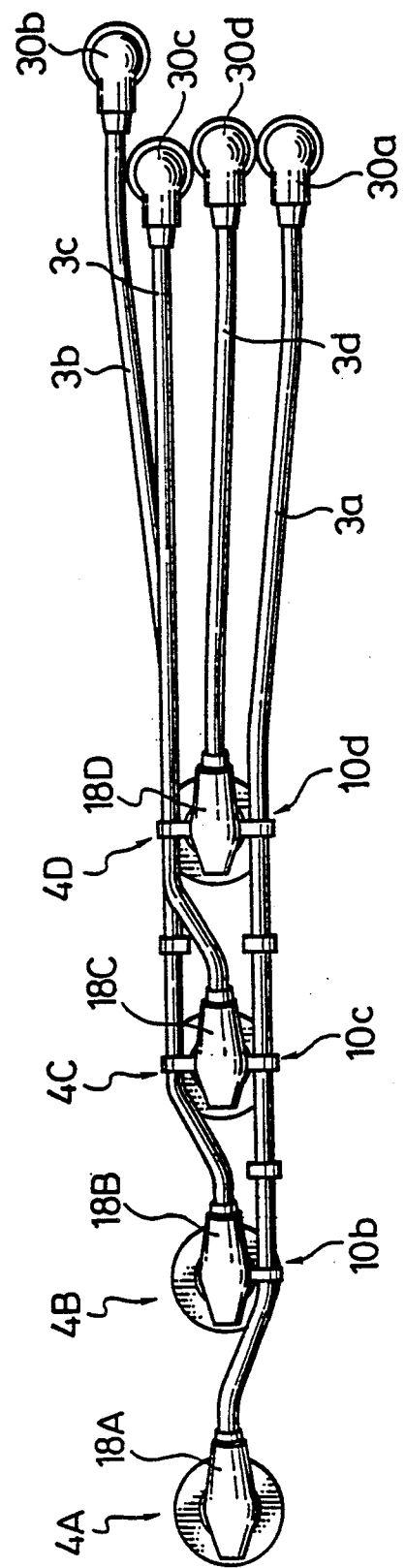

IGNITION PLUG SOCKET

BACKGROUND OF THE INVENTION

1. Field of the Invention

The present invention relates to an ignition plug socket attached to an ignition plug mounted on an engine, and more specifically to a high tension cord clamp member attached to one ignition plug socket to clamp a plurality of high tension cords connected to ignition plugs via the other ignition plug sockets.

2. Description of Prior Art

In an internal combustion engine for automotive vehicles, a plurality of plug sockets are removably attached to an engine body to supply a high tension to each ignition plug via each ignition (high tension) cord. However, when these high tension cords are vibrated during engine running or vehicle travelling, there exist problems in that the ignition plug sockets are loosened or removed from the ignition plugs or the high tension cords are vibrated in contact with the engine body into abrasion, so that high tension leaks.

To overcome these problems, a high tension cord clamp member 1 as shown in FIGS. 1(A) and 1(B) has been proposed, in which a plurality of high tension cords 3 are arranged within a groove 2a formed in an engine head cover 2. One end of each of these high tension cords 3 is connected to an ignition plug socket 4 connected to each ignition plug (not shown). To clamp these high tension cords 3, a cord clamp member 1 is fixed to two boss portions 6 formed integral with the engine cover head 2 by means of two clamp legs 5 so that the cord clamp member 1 crosses the groove 2a. This cord clamp member 1 is formed with a plurality of cutout portions 1a for holding high tension cords 3.

Further, a similar high tension cord clamp member is disclosed in Japanese Published Unexamined Utility Model Appli. No. 61-167479, in which high tension cords are clamped by cord holding cutout portions formed in a flat projection plate formed integral with the outer circumference of the ignition plug socket.

In the first prior-art cord clamp member shown in FIGS. 1(A) and (B), however, since the cord clamp member 1 is mounted on the engine head cover 2, the material of these cord clamp members must be high in heat resistance and rigidity, and therefore the material cost is high. In addition, since the cords 3 are inserted into the cord holding cutout portions 1a from above, there exist various problems in that the cord sheath is often damaged or worn away by vibration, so that the cord insulation fails; the boss portions 6 to which the clamp member 1 is fixed must be formed integral with the engine head cover 2 in die casting process, so that the manufacturing cost is high; since it is difficult to dispose plural cord clamp members within the groove 2a, the ignition cords are often loosened or not arranged in parallel to each other in order, so that the plug sockets 4 are removed from the engine cover head 2 due to vehicle vibration.

Further, in the case of the second prior-art cord clamp member, since the flat projection plate including the cord clamp cutout portions is formed integral with the plug socket, there exists another problem in that a number of plug sockets having different flat projecting plates including the different numbers and positions of cutout portions must be prepared according to the cord arrangement positions or the models of engines, thus increasing the number of parts and therefore the cost of the ignition plug sockets.

SUMMARY OF THE INVENTION

With these problems in mind, therefore, it is the primary object of the present invention to provide an ignition plug socket provided with a cord clamp member simple in structure and therefore low in cost, easy to arrange high tension cords within a small and narrow space on an engine head cover, stable in clamping force, and applicable to the different numbers and the different arrangement positions of high tension cords, that is, to various engines of different models.

To achieve the above-mentioned object, the ignition plug socket according to the present invention comprises: (a) a plug socket body (19); (b) a high tension cord clamp member (10) removably attached to said plug socket body, said high tension cord clamp member having: (1) at least one cord clamp portion (10A) formed with at least one cord holding cutout portion (17); (2) a two-separable cord clamp mounting portion (10B) formed integral with said at least one cord clamp portions; and (3) locking means (15, 16) for locking said two-separable cord clamp mounting portion mounted on said plug socket body.

The plug socket body is formed with at least one locating projection (22), and the two-separable cord clamp mounting portion is formed with at least one locating groove (12) engageable with the locating projection when the clamp member is mounted on the plug socket.

The two-separable cord clamp mounting portion comprises: (a) a pair of first upper and lower semicircular ring portions (11a, 11b) connected by a first connecting portion (13a); and (b) a pair of second upper and lower semicircular ring portions (12a and 12b) connected by a second connecting portion (13b). The locking means is two projections (15a, 15b) formed in the two lower semicircular ring portions (11b and 12b), respectively and two recesses (16a, 16b) formed between the two upper and lower ring portions (11a, 11b) (12a, 12b), respectively.

The cord clamp member includes one or two cord holding portions (10A), and the each cord holding portion includes a single or double cord holding cutout portions (17).

In the ignition plug socket according to the present invention, since the cord clamp member can be selectively and removably attached to the plug socket, it is possible to freely select an appropriate cord clamp member of different types having an appropriate number of cord holding portions and an appropriate number of cord holding cutout portions, according to engine models of different ignition plug locations, without changing the plug socket.

Therefore, plural high tension cords can be arranged accurately and orderly within a narrow space on an engine head cover for prevention of cords from vibration. Further, the high tension cord arrangement work productivity can be improved, because high tension cords can be previously assembled by the selected cord clamp members before the plug sockets are connected to the ignition plugs.

BRIEF DESCRIPTION OF THE DRAWINGS

FIG. 2 is a perspective view showing a plug socket of the present invention in the state where no high tension cord clamp member is not yet attached;

FIG. 3 is a side view showing a plug socket according to the present invention, in which a cord clamp member is attached;

FIG. 5 is a wiring example for assistance in explaining a high tension cord assembly according to the present invention, in which four cords connected to four different plug sockets are clamped for arrangement by three different cord clamp members;

DETAILED DESCRIPTION OF THE PREFERRED EMBODIMENTS

Figure 1A:
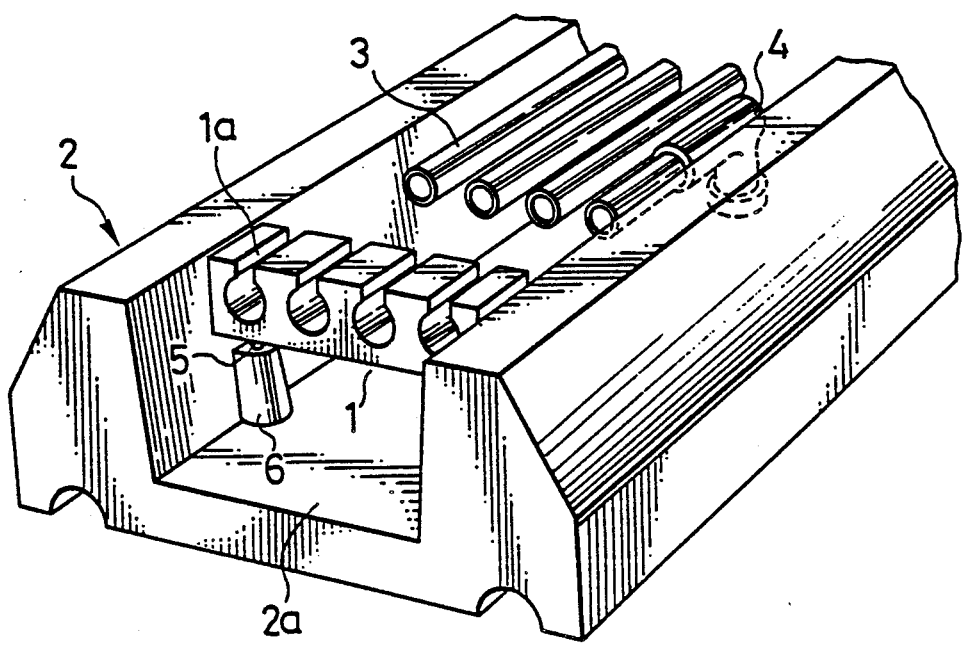
FIG. 1(A) is a perspective view showing a prior-art high tension cord clamp member attached to an engine head cover.
Figure 1B:
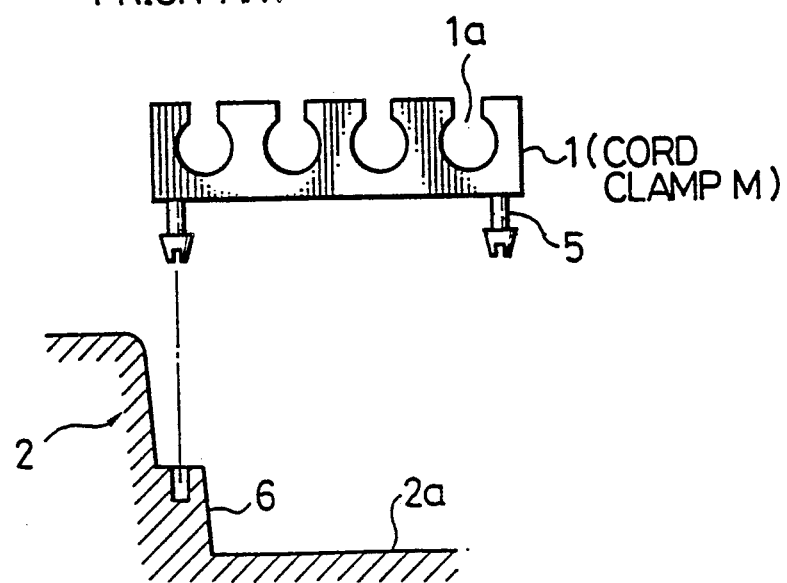
FIG. 1(B) is a front view showing the same cord clamp number shown in FIG. 1(A)

The embodiment of the ignition plug socket provided with a cord clamp member according to the present invention will be described hereinbelow with reference to the attached drawings.

FIG. 2 shows an ignition plug socket, in which no cord clamp member is attached. The ignition plug socket comprises an upper plug cap 18 for covering a high tension cord (as shown in FIG. 5), a cylindrical socket body 19, and a lower plug cap 20. Further, a flange 18a is formed at the upper side of the plug socket so as to be engaged with an ignition hole (not shown) formed in an engine cover head. In addition, a pair of small semicylindrical projections 22 are formed integral with the upper plug cap 18, so that the cord clamp member 10 shown in FIG. 3 can be mounted on the plug socket 4 at a predetermined angular position.

As shown in FIG. 3, a cord clamp member 10 is attached to the upper plug cap 18 and on the flange portion 18a. The cord clamp member 10 comprises a cord clamp portion 10A and a two-separable (i.e. two-part separable) cord clamp mounting portion 10B. The cord clamp portion 10A is formed with two cord holding cutout portions 17 for holding two high tension cords.

Figure 4A:
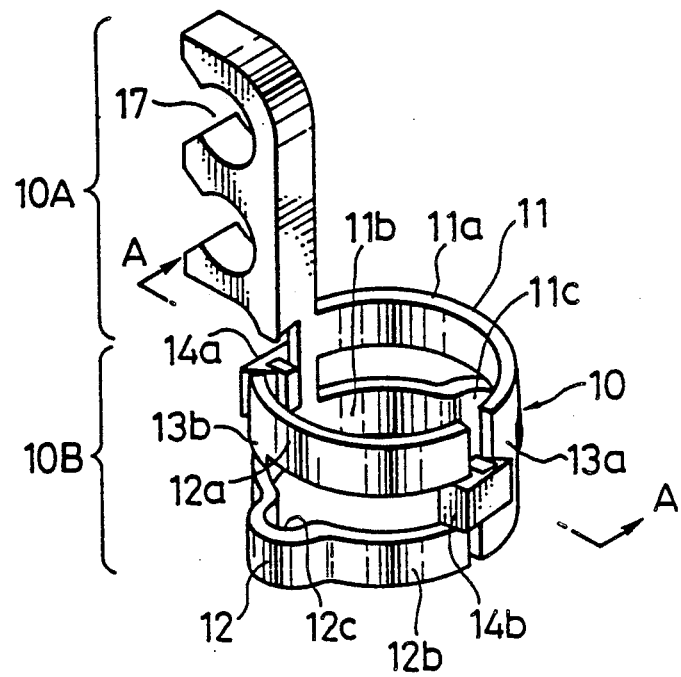
FIG. 4(A) is a perspective view showing the cord clamp member attached to the plug socket according to the present invention.
Figure 4B:
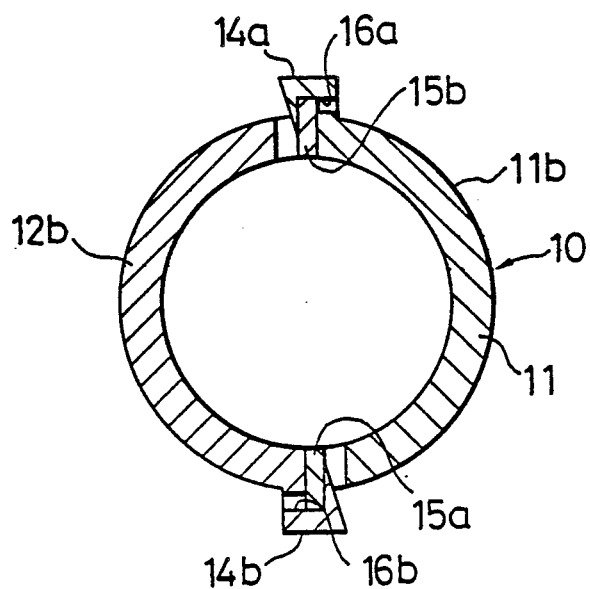
FIG. 4(B) is a cross-sectional view taken along the line A shown in FIG. 4(A)

As shown in FIGS. 4(A) and (B), the cord clamp mounting portion 10B comprises a pair of first upper and lower semicircular rings 11a and 11b connected by a first connecting portion 13a and a pair of second upper and lower semicircular rings 12a and 12b connected by a second connecting portion 13b. As shown in FIG. 4(B), a first projection 15a is formed near the first lower semicircular ring portion 11b and a second projection 15b is formed near the second lower semicircular ring portion 12b. Further, a first recess 16a is formed between the two upper and lower ring portions 11a and 11b so as to be engaged with the second projection 15b, and a second recess 16b is formed between the two upper and lower ring portions 12a and 12b so as to be engaged with the first projection 15a.

Further, the first lower semicircular ring 11b is formed with a semicylindrical groove 11c so as to be engaged with the one projection 22 formed in the plug socket 4, and the second lower semicircular ring 12b is formed with a semicylindrical groove 12c so as to be engaged with the other projection 22 formed in the plug socket 4.

Therefore, the cord clamp member 10 can be attached to the plug socket 4 by first engaging the two semicylindrical grooves 11c and 12c of the lower semicircular rings 11a and 11b with the two projections 22 formed at the upper portion of the plug socket 4, and then by engaging the two projections 15a and 15b with the two recesses 16a and 16b to couple the first upper and lower semicircular rings 11a and 11b with the second upper and lower semicircular rings 12a and 12b in such a way that the upper plug cap 18 can be sandwiched by the two-separable cord clamp mounting portion 10B or between the first semicircular ring 11 and the second semicircular ring 12.

FIG. 5 shows an example of a high tension cord arrangement assembly or the high tension cord clamping method, in which four ignition plug sockets 4A, 4B, 4C and 4D are attached to four ignition plugs (not shown) for an engine. Four upper plug caps 18A, 18B, 18C and 18D are connected to four plug caps 30a, 30b, 30c and 30d provided on the high tension distributer side through four high tension cords 3a, 3b, 3c and 3d, respectively. In this example, three cord clamp members 10b, 10c and 10d are attached to the the three plug sockets 4B, 4C and 4D, respectively to clamp the high tension cords as shown.

Figure 6A:
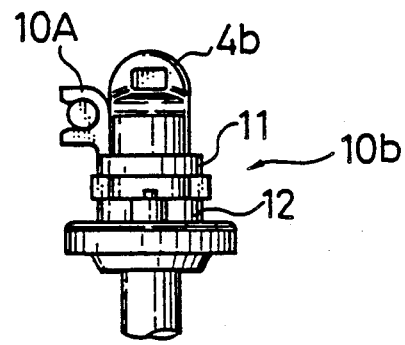
FIG. 6(A) is a side view showing a first type of the cord clamp member.
Figure 6B:
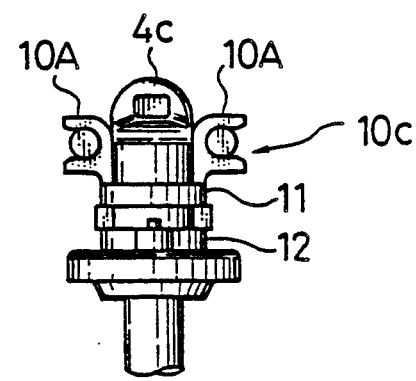
FIG. 6(B) is a side view showing a second type of the cord clamp member.
Figure 6C:
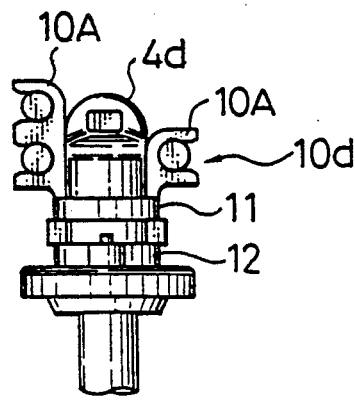
FIG. 6(C) is a side view showing a third type of the cord clamp member.

The cord clamp member 10b has a cord clamp portion 10A formed with a single cord holding cutout portion 17 on one side thereof as shown in FIG. 6(A); the cord clamp member 10C has two cord clamp portions 10A formed with a single cord holding cutout portion on both the sides thereof respectively as shown in FIG. 6(B); and the cord clamp member 10d has two cord clamp portions 10A formed with single and double cord holding cutout portions, respectively on both the side thereof as shown in FIG. 6(C).

In the present invention, when some cord clamp members of different types having the different numbers and positions of cord holding cutout portions are previously prepared, it is possible to selectively mount the different cord clamp members to the plug sockets, respectively according to the positions of ignition plugs (to which the plug sockets 4 are attached) or the arrangement of the high tension cords, in order to clamp different high tension cords of different engine models. In other words, since only the same plug socket 4 can be used for various high tension cord arrangements by changing only the cord clamp member, it is possible to reduce the cost of the plug socket 4. Further, since the plug socket 4 is formed with two projections 22 so as to be engaged with the two grooves 11c and 12c of the clamp member 10, the cord clamp member 10 can be stably fixed to the plug socket 4 so as not to be movable in the axial and circumferential directions of the plug socket 4. Further, since the plural plug sockets 4 are connected to each other by the cord clamp members 10 and the high tension cords 3, it is possible to effectively prevent the plug sockets 4 from being removed from the ignition plugs owing to the weight of the cords 3. Further, since it is possible to previously clamp high tension cords as a high tension cord assembly by use of the cord clamp members 10, before the plug sockets 4 are attached to the ignition plugs, the cord assembly productivity can be improved. Further, the high tension cords 3 can be arranged tightly within a narrow space on the engine head cover and clamped at any given positions tightly and stably for prevention of the cords from vibration.

In the embodiment shown in FIGS. 5 and 6, an example of four ignition plugs has been explained. Without being limited thereto, however, it is possible to apply the plug socket provided with a cord clamp member according to the present invention to various cord arrangement requirements only by changing the number and positions of the cord clamp portions 10A and further the number of cord holding cutout portions 17 formed in the cord clamp portion 10A without changing the plug sockets according to various engine models. Further, in the above embodiment, the two semicircular rings 11 and 12 are coupled with each other by means of projections 15 and the recesses 16. Without being limited thereto, however, it is possible to couple the two semicircular rings 11 and 12 by other locking means such as wedges, screws, belts, etc.

As described above, in the ignition plug socket provided with a cord clamp member according to the present invention, since the cord clamp member of different types is removably attached to the plug socket, it is possible to freely select any required cord clamp member according to the positions of the plug sockets or the number and position of high tension cords, so that it is possible to use the same plug socket for various engines.

Further, since the cord clamp member can clamp the high tension cords stably within a narrow space and further the high tension cord clamping work can be attained before the plug sockets are attached to the ignition plugs, it is possible to facilitate cord arrangement work or improve the high tension cord arrangement productivity.

What is claimed is:
1. An ignition plug socket and card clamp combination, comprising:
 (a) a plug socket body;
 (b) a high tension cord clamp member removably attached to said plug socket body, said high tension cord clamp member having:
  (1) at least one cord clamp portion formed with at least one cord holding cutout portion;
  (2) a two-part separable cord clamp mounting portion formed integral with said at least one cord clamp portion; and
  (3) locking means for locking said two-separable cord clamp mounting portion mounted on said plug socket body.

2. The ignition plug socket of claim 1, wherein said plug socket body is formed with at least one locating projection and said two-part separable cord clamp mounting portion is formed with at least one location groove engageable with said locating projection when said cord clamp member is mounted on said plug socket body.

3. The ignition plug socket of claim 1, wherein said two-part separable cord clamp mounting portion comprises:
 (a) a pair of first upper and lower semicircular ring portions connected by a first connecting portion; and
 (b) a pair of second upper and lower semicircular ring portions connected by a second connecting portion.

4. The ignition plug socket of claim 3, wherein said locking means is
 (a) a first projection formed near said first lower semicircular ring portion and a second projection formed near said second lower semicircular ring portion; and
 (b) a first recess formed between said two upper and lower ring portions so as to be engageable with said second projection and a second recess formed between said two upper and lower ring portions so as to be engageable with said first projection.

5. The ignition plug socket of claim 1, wherein said at least one cord clamp portion includes a single cord holding cutout portion.

6. The ignition plug socket of claim 1, wherein said at least one cord clamp portion includes two cord holding cutout portions.

7. The ignition plug socket of claim 1, wherein said high tension cord clamp member includes first and second cord clamp portions.

8. The ignition plug socket of claim 7, wherein said first cord clamp portion includes a single cord holding cutout portion and said second cord clamp portion includes two cord holding cutout portions.

* * * * *